No. 11,776. Reissued Oct. 3, 1899.

C. CRAWFORD & H. W. BULLARD.

BOX MAKING MACHINE.

(Application filed Aug. 15, 1899.)

4 Sheets—Sheet 1.

Witnesses:
F. E. Newton
J. Stockman

Inventors:
Henry William Bullard
Charles Crawford
By Hubbard & Bull
Attorneys

No. 11,776. Reissued Oct. 3, 1899.

C. CRAWFORD & H. W. BULLARD.

BOX MAKING MACHINE.

(Application filed Aug. 15, 1899.)

4 Sheets—Sheet 2.

Witnesses:
A. E. Newton
C. J. Stockman

Inventors.
Henry William Bullard
Charles Crawford
By Lutwis & Bull
Attorneys

No. 11,776. Reissued Oct. 3, 1899.
C. CRAWFORD & H. W. BULLARD.
BOX MAKING MACHINE.
(Application filed Aug. 15, 1899.)
4 Sheets—Sheet 3.
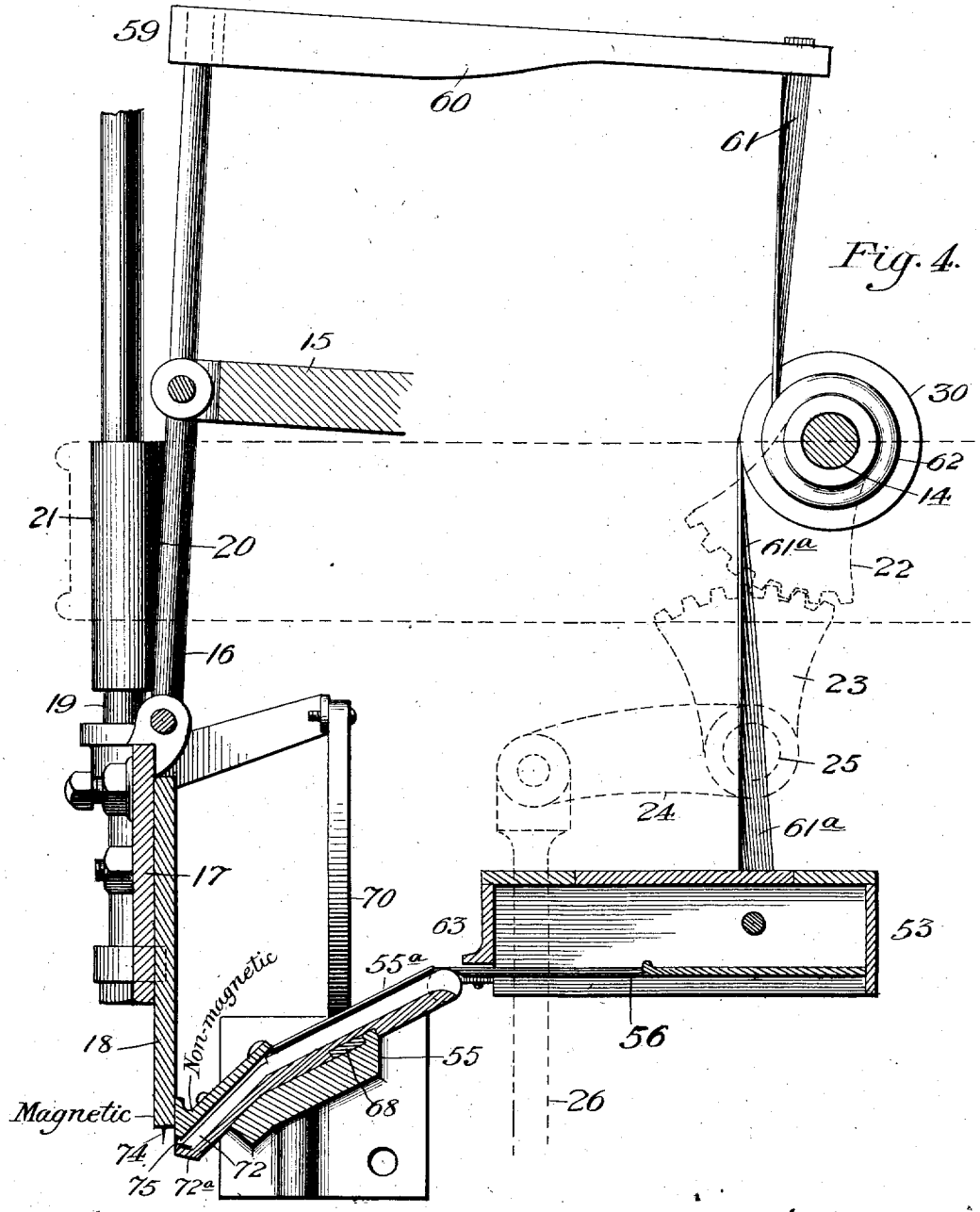
Witnesses:
A. E. Newton
C. J. Strickman
Inventors.
Henry William Bullard
Charles Crawford
By Hopkins & Bell
Attorneys No. 11,776. Reissued Oct. 3, 1899.

C. CRAWFORD & H. W. BULLARD.

BOX MAKING MACHINE.

(Application filed Aug. 15, 1899.)

4 Sheets—Sheet 4.

Witnesses:
F. C. Newton
J. H. Kerman

Inventors.
Henry William Bullard
Charles Crawford
By Hubbard and Bull
Attorneys

UNITED STATES PATENT OFFICE.

CHARLES CRAWFORD, OF CLINTONDALE, AND HENRY WILLIAM BULLARD, OF POUGHKEEPSIE, NEW YORK, ASSIGNORS TO THE POUGHKEEPSIE FOUNDRY AND MACHINE COMPANY, OF POUGHKEEPSIE, NEW YORK.

BOX-MAKING MACHINE.

SPECIFICATION forming part of Reissued Letters Patent No. 11,776, dated October 3, 1899.

Original No. 629,775, dated August 1, 1899. Application for reissue filed August 15, 1899. Serial No. 727,292.

*To all whom it may concern:*

Be it known that we, CHARLES CRAWFORD, residing at Clintondale, Ulster county, and HENRY WILLIAM BULLARD, residing at Poughkeepsie, Dutchess county, New York, citizens of the United States, have invented certain new and useful Improvements in Box-Making Machines, of which the following is a specification, reference being had therein to the accompanying drawings.

Our invention relates to machinery for the manufacture of boxes and baskets, and has for its object to improve machines of the type which employ reciprocating magnetic hammers for driving the nails or tacks.

The invention consists in the improvements of the tack or nail feeding mechanism, the reciprocating hammer mechanism, the supporting and actuating devices for the former upon which the box or basket is placed while being nailed, the presser-finger mechanism, and in other details of construction and arrangement of the apparatus to be hereinafter described and pointed out.

That our invention may be better understood we have illustrated in the accompanying drawings one form of embodiment thereof, without intending, however, to limit our invention in its usefulness to the exact embodiment which we have shown.

Figure 1:
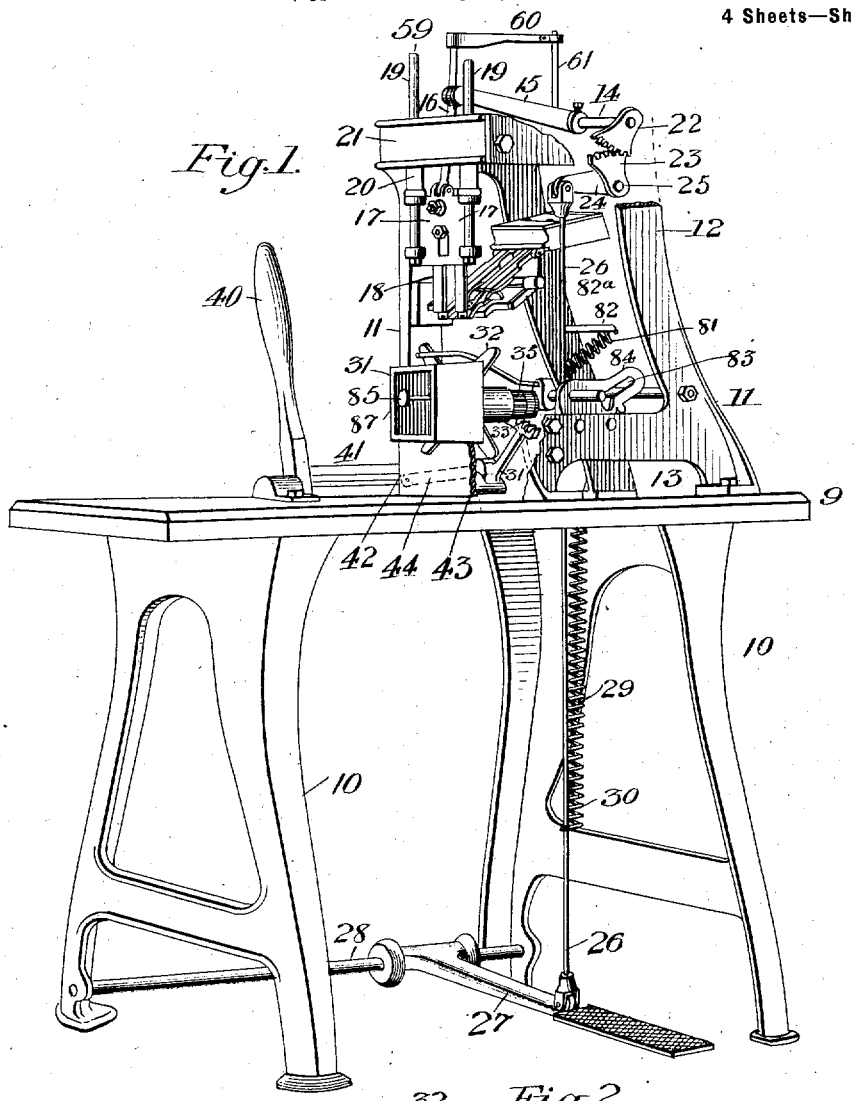
Figure 2:
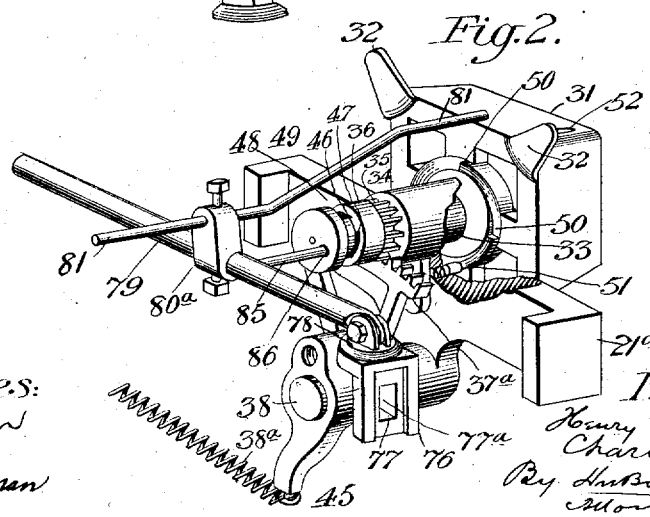
Figure 3:
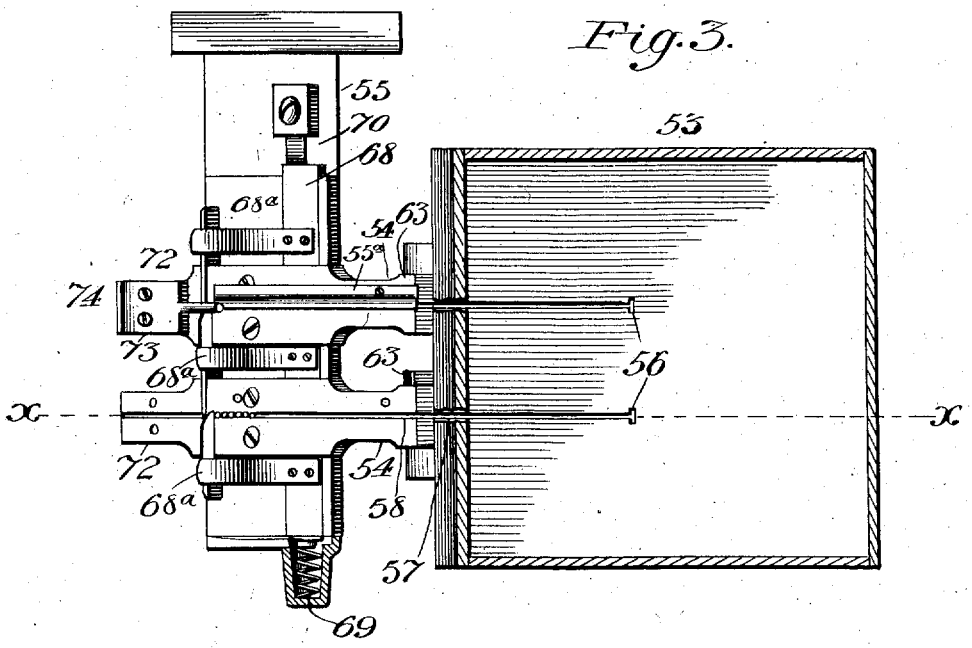
Figure 5:
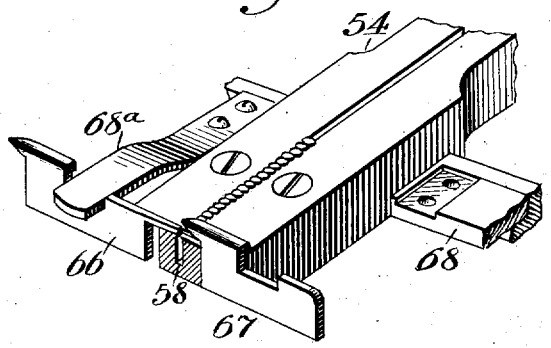
Figure 6:
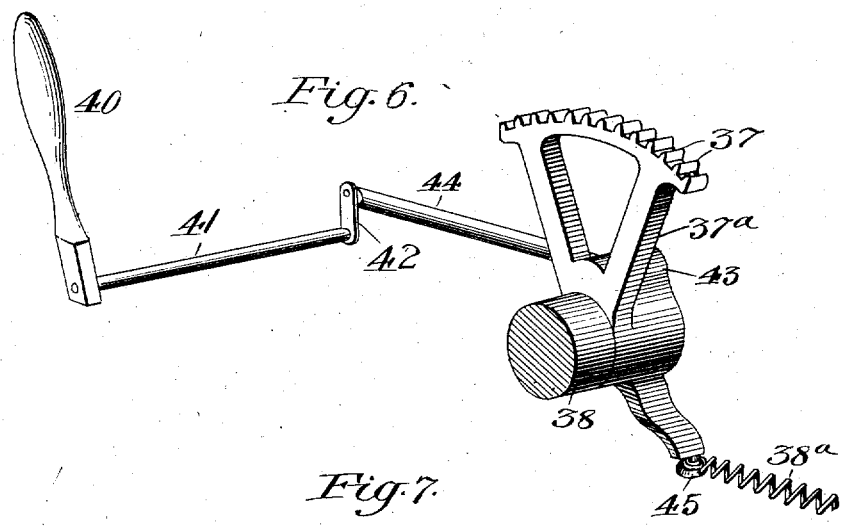
Figure 7:
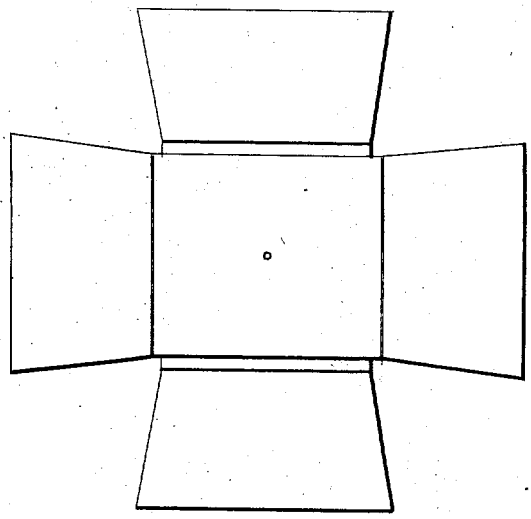

In the drawings, Figure 1 shows a front elevation in perspective of a machine embodying our improvements. Fig. 2 is a rear view in perspective of the former and presser-finger mechanisms, having portions of their parts broken away for the purpose of more clearly illustrating the relationship of the coacting parts. Fig. 3 indicates, in an enlarged view, a top plan view of the tack-feeding mechanism, while Fig. 4 is a horizontal section thereof, taken on the line X X of Fig. 3. Fig. 5 shows a detail of the tack-feeding mechanism illustrated in Figs. 3 and 4. Fig. 6 shows in perspective and detached from the framework of the machine the train of actuating-levers for operating the former or anvil. Fig. 7 shows the crossed strips of veneer required in the manufacture of baskets on our machine, while Fig. 8 indicates the manner of placing the same on the former in conjunction with the fastening-bands in readiness to be nailed.

Like numerals indicate like parts in the several figures.

The work-supporting table 9 and the cast-iron legs or standards 10 constitute the supporting-framework of the machine. Mounted on said table is the upper frame or stand 11, which is of suitable size and shape to properly support the operating mechanism. This standard is formed of uprights 12 and cross-pieces 13, that are assembled and rigidly bolted together, and when thus organized is intended to serve as a support for the main shaft, the vertically-reciprocating hammers, the former or anvil, and the tack-feeding mechanism.

The main shaft 14 extends longitudinally and is journaled in suitable bearings at the top of the standard and is actuated by treadle mechanism, which will be hereinafter described. Mounted on said shaft at a point between its bearing ends is a forwardly-projecting rocker arm or lever 15, that is connected at its forward end to a pendent swing-rod 16, whose lower end is likewise pivotally connected to a reciprocating guide plate or gate 17, which latter is adapted to carry the hammers 18. The gate thus suspended is slidingly supported for vertical reciprocation by a pair of vertical guide-rods 19, arranged in parallelism at either side of the gate and which are adapted to pass vertically through the ways 20 in the upper cross-bar 21 of the frame situated directly above. When the shaft 14 is rocked to and fro, it operates to raise and lower by simultaneous movement said gate and attached hammer-bars. The rocking of said shaft 14 is effected by the following means, which include a gear-segment 22, mounted on said shaft, and which meshes with a corresponding segment 23, that is secured to the adjacent end of a rocking lever 24, and which is designed to effect a change of motion between the said lever 24 and the shaft 14. The lever 24 is fulcrumed by means of a stud 25, that projects inwardly from the upright 12 of the standard. The rocker-lever thus arranged swings in a vertical plane and serves as a connecting-lever interposed between the treadle-rod 26 and the shaft 14. The connecting-rod 26 has its opposite or lower end pivoted to a foot-lever or treadle-bar 27. This treadle-bar is pivotally mounted on the supporting-bar 28 of the lower frame. We employ the treadle as a lifting mechanism to impart a backward movement to the shaft 14 and which is accompanied in said movement by the simultaneous raising of the rocker-arm and connected gate and hammers, the weight of the latter being sufficient ordinarily to return the treadle-bar to its normal position upon the removal of the pressure of the foot of the operator. As an auxiliary means to assist in the quick return of said parts we employ in connection with the treadle-rod 26 a pull-spring 29, that is shown as being connected at its lower end to the treadle-bar at 30 and at its opposite upper end to the bottom of the table. From the combination thus defined it will be seen in what manner the hammers are vertically reciprocated. The shaft 14 also carries loosely mounted thereon a differential pulley 30, (shown in Fig. 3,) whose office will be hereinafter specified and explained.

The former or anvil 31 is shown as consisting of a metallic shell of any desired shape and is provided on its inner corners with ears 32, the office of which will be hereinafter pointed out. Said former is shown as being axially mounted upon the projecting end of the shaft 33, which is supported in horizontal position and extends through a sleeve 34, supported on the cross-bar 21ª, that forms the front bottom part of the upper framework. Said shaft is made to progressively rotate by means of an annular series of teeth 35, formed on the sleeve 36, which is mounted on said shaft and which is adapted to operate in connection with the teeth 37, formed on the segmental rack 37ª, which latter is mounted rotatively on the horizontal inwardly-extending stud 38, that projects from the bottom cross-bar 21ª. The segmental rack 37ª receives its motion and power by reason of its operative connection with the shifting lever 40, that is mechanically joined thereto by means of a rocking shaft 41, mounted horizontally on said table and arranged adjacent to the stand, said lever 40 being within convenient reach of the operator. The rocking shaft 41 is provided at its opposite end with a lever 42, attached at right angles thereto, which in turn is connected to the segmental rack at 43 by the connecting-rod or back bar 44. The segmental rack is pivotally supported and yieldingly held in normal position by the pull-spring 38ª, one end of which is attached to the table, while the other end is attached at 45 to the segmental rack, thus affording a means for quickly returning said rack to its normal position upon the release of the actuating-lever 40. From the combination thus organized it will be seen that the former or anvil may be revolved or spun about one revolution by the shifting of the lever 40; but it is necessary to insure that its rotation be in but one direction, and this is accomplished by the employment of a ratchet-and-pawl mechanism, which is preferably adapted to the shaft as follows: The sleeve 36, bearing the annular series of teeth 35 and mounted on the shaft 33, is provided on its inner peripheral walls 46 with ratchet-teeth 47, the faces of which incline forwardly, while the shaft 33 at the point where the sleeve 36 is positioned is provided with a slot 48, extending radially through said shaft and in which is slidingly fitted the pawl-piece 49, the ends of which are adapted to engage in operative connection with the teeth of the ratchet to insure the progressive revolving of the sleeve and the shaft upon which it is mounted. To prevent the rotation of the former in the reverse direction and to properly hold the anvil in position so that the hammers will strike squarely, a simple means is provided, which consists in providing on its inner face ratchet-teeth 50, that are brought into engagement with a spring-supported pawl 51, that projects horizontally from the cross-bar 21ª, into which it sockets and which enters into engagement with said ratchet-teeth whenever the former tends to turn in the opposite direction from that in which it is intended to revolve.

It is important that there should be no slipping of the inner and outer forming-bands (which are formed, preferably, as one continuous strip) when placed upon the anvil, and also provision should be made to hold one end of the band during the spinning of the former. We obtain the first desired result by the employment of the ears 32, above mentioned, while the slot 52 serves as a means for receiving and holding the inserted end of the band during the spinning of the anvil. The depth of the slot is varied, so as to form an incline that rises from the end of the slot adjacent to the inner side of the former to the surface level of the former at the point where the other end of the slot begins, thereby affording an exit for band end when it is desired to remove the basket from the former.

*Tack-feeding mechanism.*—53 represents the nail or tack box, which is shown as being pivotally supported upon the bars 54, which are in turn supported by the cross-bar 55, attached to the upright piece 12 of the standard-frame. The bottom of the box is provided with a number of slots or grooves 56, into which the nails or tacks find their way and where they are supported points downward, the number of these slots or grooves corresponding with the number of magnetic hammers or, more properly, with the numbers of ways or chutes which conduct the tacks or nails to the hammers. The bottom of the box is shaped so that the tacks or nails are fed into the slots 57, and to facilitate this, as well as the delivery of the tacks to the channel-ways 58, which lead to the hammers, the box is tipped upon its hinges as the hammer-bars reciprocate. This movement of the box may be effected in various ways; but we have shown in Fig. 1 an upright 59, extending upward from the pendent swing-rod 16, and which is provided with a rearwardly-extending arm 60, that is provided at its free end with a depending strap 61. The strap is connected with its opposite end to the smaller wheel 62 of the differential pulley 30, (see Fig. 4,) while the larger wheel thereof is connected in turn by a strap 61ª to the tack-box 53. It will be understood that whenever the shaft 14 is rocked to reciprocate the hammers at the same time the tack-box is swung upon the hinges or pivots 63, causing the tacks contained therein to be shaken up and to drop into the grooves 56 and the tacks which are already in the grooves to slide into the channels. There are as many of these channels or ways 58 as there are nails to be driven at one time, and they are formed in a block or bar 54 and are each provided with a cap-piece 55ª to prevent the tacks from jumping out. The blocks or bars are supported by the cross-piece 55 in a position to give the tack or nail channels, which comprise two portions, the proper inclination in different planes, respectively, to cause the nails to be readily fed by gravity from the nail-box toward the hammers.

At the angle formed by the upper and lower portions of the inclined channel there is arranged a device for causing the tacks or nails to be fed one at a time down the lower and more steeply inclined portion of the channel at each reciprocation of the hammers. The devices for causing the nails or tacks to be thus fed consist of two small picker-fingers 66 and 67, arranged one in advance of the other and so that their ends or points overlap and which are arranged to be reciprocated across the channel or way, one, 66, below the angle or junction of the respective portions of the channel—*i. e.*, in the plane of the lower incline portion—and the other, 67, in the plane of the upper portion of the inclined way or channel. By such a disposition of the picker-fingers relatively to each other and the respective planes the tacks or nails held in a vertical position are successively singled out by the engagement of the fingers with the shanks of the tacks and without interference or impediment caused by the engagement or wedging in of the tipping head of the tack as it passes from the upper inclined portion of the inclined way to the lower portion thereof. As the hammers are lowered the fingers are moved synchronously in a direction to bring the upper finger across the slot, and this finger is so disposed relatively to the finger 66 that it crosses the slot or channel as the lower finger moves away from its position across the slot, and in so doing it cuts off or separates the nails or tacks which had been resting against the finger 66 from the others standing in the channel, so that when the fingers have moved sufficiently far to carry the lower finger away from across the slot this lowermost nail or tack in the channel is left free to slide toward the hammer, while the others are retained by the upper finger 67. On the reverse or upward movement of the hammer the fingers are slid in the opposite direction, the lower finger 66 taking its position across the channel, so that the entire line of tacks held in the channel or way slides down toward the feeding device, but only the distance occupied by one tack or nail. These tack-feeding devices are carried by a sliding bar 68, which is arranged on the cross-bar 55, situated underneath the lower side of the blocks or bars 54. The slide-bar 68 is connected with the respective fingers of the feeding device by carrying arms 68ª. The slide-bar 68 is moved in one direction—that which causes the finger 67 to stand across the channel—by a spring 69, and in the opposite direction it is positively moved by some moving part of the machine each time the hammer-bar is reciprocated. Fig. 4 shows the reciprocating hammer-bar as having connected with it a cam-bar 70, which engages with and moves in one direction the slide-bar and against the action of the spring 69, which returns it. The tack-channel blocks are continued beyond the tack-feeding devices 66 and 67, just described, said portions 72 being more sharply inclined downward, by preference, than is the upper portion 54 thereof. The object in giving it a sharper pitch is to allow the tack to drop from the feeding devices to hammer as quickly as possible, so as to be picked up by the hammer in its upward reciprocation. The lower end of the part 72 at the mouth of the slot 58 is provided with an inclined way extending at a suitable angle upward to form a platform 72ª for the lodgment of the tack, which is thereby received with its head extending in a vertical plane and adapted to face against the rear face of the magnetic hammer-bar.

The part 72 of the tack way or channel is covered throughout a greater or less part of its extent with the cap-piece 73, which is so shaped as to have a vertical front face 74, which latter is disposed in a vertical plane and against which the hammer-bar of magnetic iron slides as it is reciprocated up and down. There is formed a recess 75 on the lower part of the front face of the cap-piece immediately adjacent to the slot 58 to permit the stem or body of the tack to rest against its upper wall while the head thereof slides from the rear face of the hammer-bar to the ends thereof. The cap-piece above referred to, as well as the block or bars in which the channel for the tacks is formed, should be made of some metal which will not become magnetized, and to such an end we prefer to use brass.

Each time the hammer is depressed to drive a tack or nail another tack or nail slides down the part 72 of the way and rests against the stop-plate 73 and with the head adjacent to or in contact with the rear face of the magnetic hammer-bar. As the hammer is raised it carries the nail or tack up with it until it comes into engagement with the wall of the recess 75 by the attraction which the magnet has for it. The lower face of the magnetic hammer-bar rising above the recess 75 operates to sweep off the tack-head from engagement with the rear face of the hammer-bar. This movement, however, does not operate to disengage the tack from the magnetic hammer-bar, but rather causes its head to engage with and be held against the lower end of the bar, as indicated in Fig. 4. The tack or nail is caused to turn from the position indicated in Fig. 4 in dotted lines at right angles to the hammer-bar to the position indicated in Fig. 4 in full lines, perpendicularly in line with the hammer-bar, by reason of the lower end of the hammer-bar moving upward beyond the edge of the cap-plate 73, so that the head of the tack is not only moved from engagement with the rear to the end face of the hammer-bar, but is also turned into line therewith. When the tacks are held in the latter position, the sudden dropping of the hammers operates to drive the nails or tacks, as will be understood. It will thus be seen that there is combined with the tack ways or channels and the means for feeding the tacks one at a time, which devices may be of any usual or preferred construction, a mechanism which delivers the tacks or nails to the striking-face of the hammer with the body of said nail in line with the movement of the hammer, and that the mechanism is very simple in its construction and effective in its operation.

In view of the fact that the magnetism of the hammer operates to draw the nail from the channel and hold it in place during the forward movement of the hammer it is important that such movement should be capable of being governed by the operator, and therefore the treadle is provided as a means for imparting such forward movement, while the downstroke, which should be as rapid as possible, is imparted by gravity.

It will be understood that the proportions of certain of the parts of the apparatus as shown in the drawings—the tackways and their associated parts, for instance—are out of proportion to the other parts of the apparatus; but this is done for the better illustration of the invention, as in practice these parts will be of relatively small size.

We will now proceed to describe the presser-finger attachment and its arrangement and method of operating in properly holding the band to the former in position during the fastening of the lapped end.

Attached rigidly to the standard 11 is a supporting-piece 77, that is provided with a slot 77ª, which latter admits of vertically adjusting said piece. To this piece is hinged and swiveled at 78 the horizontal carrying-lever 79, upon which is carried, substantially at right angles thereto, the forwardly-extending presser rod or finger 81, and which is supported thereon by means of the block 80ª. This finger-rod is bent in a suitable manner for the purpose of presenting its free end in a plane horizontally coincident with that of the upper face of the anvil when brought into operative relation thereto. The carrying-lever 79 is yieldingly sustained in normal position by the spring 81, which latter is attached to the frame-upright 21 at 82, while the outer free end of the carrying-rod is slidingly mounted within the slotted guide 83, formed in the piece 84. When it is desired to manipulate the said finger-rod, the free end of the carrying-rod is grasped by the operator, and, if moved to the lower depression in said slot, will act to hold the presser-finger firmly down upon the band end required to be held, while if it is moved to its forward limit in said guide the carrying-rod or its block 80ª is brought into contact with the ejector-rod 85, which latter fits telescopically in and through the bore 86, that extends longitudinally through the shaft 33 and to one side of the pawl-slot 48, that extends radially therethrough, and which ejector-rod is provided with a head 87, that is adapted to strike the inner face of the basket on the former when driven outwardly by the thrust of the carrying-rod and in that manner remove the basket from the former or anvil, as well as disengaging the inserted end of the band from the slot 52. When the carrying-rod is released from the hand of the operator, it drops back until its projected end is arrested by the inner limit of the guide-slot. It will thus be seen that by the arrangement described in the foregoing the former mechanism and the presser-finger attachment can be handled with convenience and rapidity.

Figure 8:
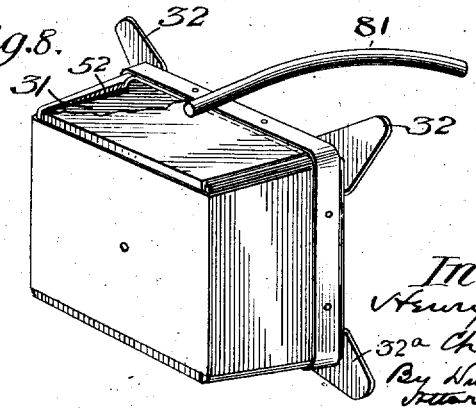

Having given a mechanical description of our invention, we will now proceed to describe its operation, which is substantially as follows: The basket is made of two or more strips of wood veneer and a narrow band of like flexible material. (Shown in Fig. 7.) The principal strips for the body of the basket are preferably crossed centrally and secured together with a single tack or nail. The first step in the operation of the machine is to place one end of the flexible band in the groove or slot 52, as shown in Fig. 8, in the corner of the anvil. Then by the revolving mechanism described one complete revolution of the anvil is made. Then the two strips of veneer, which are crossed and secured centrally, which had also in the cutting been scored so that they will bend easily over the form, are placed on the anvil and held by the hand of the operator to conform to the shape of the anvil. The revolution of the anvil at this time by the hand, while the other hand still holds the flexible band tight, now places the band on the outside of the veneer. The lifting of the treadle now drops the magnetic hammers, which carry in suspension by the head tacks on the lower faces thereof and which by the force of the blow drives the tacks through the outer band, veneer, and inner band and clenches them to the inner band by reason of their contact with the metal anvil. A depression of the treadle then will raise the gate and at the same time the magnetic hammers. Each in their upward movement will receive a tack or nail from the feeding device, as heretofore described, and by the operation described above each side of the basket is in turn nailed properly. When the last tacks are to be driven, the end of the band is held in position by the holding-down finger, as shown in Fig. 8, and as soon as the hammers rise from driving the last tacks in the now-completed box the continued forward movement of the holding-down lever acts upon the ejector-rod, as described, and removes the box from the anvil.

Having described our invention, what we desire to claim as new and useful is—

1. In a box or basket machine, the combination with the framework, of a vertically-reciprocating gate, a magnetic hammer or hammers carried thereby, and means for guiding said gate and hammers in a true vertical plane, a rock-shaft mounted in the frame and provided with an arm, a connection between the arm and the gate, a channel or way for the feeding of nails or tacks, in range of the traveling hammer and terminating adjacent to the inner face of the hammer and having a cap-piece of non-magnetizable metal that serves as a guide for the tacks in feeding the heads thereof to the hammer ends and against which the hammer slides in its travel past the feedway; a treadle, and connections between the treadle and said shaft, whereby the latter is operated, substantially as described.

2. In a box or basket making machine, the combination with the framework of a vertically-reciprocating gate, a magnetic hammer or hammers carried thereby, a rock-shaft mounted in the frame and provided with an arm, a connection between the arm and the said gate; a treadle having a spring arranged in a relation of opposition thereto, and connections between the treadle and shaft, whereby the latter is operated to lift the hammer mechanism when the treadle is depressed, substantially as described.

3. In a box or basket machine, the combination of a vertically-reciprocating gate carrying the hammers, a rocking box for containing the tacks or nails, a rock-shaft and connections therewith for operating said hammers, a differential pulley mounted loosely on said shaft, and connecting means between said pulley and reciprocating gate and between said pulley and the rocking box; and suitable guideways between the box and the reciprocating hammers, substantially as described.

4. In a box or basket machine, the combination of a hammer mechanism for reciprocating the hammer, an inclined way or channel for directing the tacks or nails to the hammer, the lower portion of said inclined way being more steeply inclined and forming an angle with the upper portion, and a feeding device for causing the tacks or nails to pass through the lower portion of the inclined way one at a time, that comprises a pair of overlapping pointed picker-fingers, one arranged in advance of the other to single out the tacks or nails, and the other below the angle and thus below the head of the tack, and means for positively moving the finger-pairs, synchronously, in one direction and a means for moving said pairs, synchronously in the opposite direction, substantially as described.

5. The combination of a hammer, reciprocating substantially in a vertical plane, an inclined channel or way through which the nails or tacks are fed by gravity to the hammer, the end of the channel being immediately adjacent to the traveling hammer, the lower portion of said channel being inclined downward at a sharper angle than is the upper portion thereof, while the mouth portion thereof is provided with an inclined way extending at a suitable angle upward to form a platform for the lodgment of the tacks, and a cap-piece extending across the said channel or way at its end, which serves as the hammer is being moved past the end of the said channel to engage with the said tack to deliver the head thereof in engagement with the back of the hammer-bar, and allow said tack-head to be moved to the striking end of said hammer, substantially as described.

6. The combination of a reciprocating magnetic hammer, a channel or way for the nails or tacks terminating adjacent to one face of the hammer, said hammer being guided to pass the end of the channel in contact with the forward tack therein and operating by magnetism to draw the tack from said channel, and a cap-piece of non-magnetizable metal covering the said channel or way at its end and which serves as a guide for the tacks in feeding the heads thereof to the hammer ends and forms an inner guide for the traveling hammer, substantially as described.

7. The combination of a reciprocating magnetic hammer, a channel or way for the nails or tacks terminating adjacent to one face of the hammer, said hammer being guided to pass the end of the channel in contact with the forward tack therein and operating by magnetism to draw the tack from said channel, and a cap-piece of non-magnetizable metal, having a recessed front face, against which the hammer moves, substantially as described.

8. The combination with a carrying-rod, having a hinged and swiveled connection at one end, and supported near its opposite end by guide-slot piece, of a presser-finger mounted on said carrying-rod substantially at right angles, said presser-finger being extended substantially as described.

9. The combination with a revoluble former provided with guide-ears and having a slot for holding the band during the revolving of the form, of a presser-finger adapted to be brought into operative relation thereto during the fastening of the lapped end of the band substantially as described.

10. The combination with a revoluble former provided with guide-ears and having a slot for holding the band during the revolving of the form, of a presser-finger adapted to be brought into operative relation thereto during the fastening of the lapped end of the band, and an ejecting-rod for removing the band from the slot, and the basket from the former, substantially as described.

In testimony whereof we affix our signatures in presence of two witnesses.

CHAS. CRAWFORD.
HENRY WILLIAM BULLARD.

Witnesses:
ALICE M. WOOD,
FRANK J. CONNOLLY.